Sept. 26, 1967

D. P. BOLTON 3,344,341

REGULATING TRANSFORMER SYSTEM

Filed Dec. 31, 1963

INVENTOR.
DONALD P. BOLTON
BY
Robertson & Smythe
ATTORNEYS

United States Patent Office 3,344,341
Patented Sept. 26, 1967

3,344,341
REGULATING TRANSFORMER SYSTEM
Donald P. Bolton, Elk Grove Village, Ill., assignor to Basic Products Corporation, Milwaukee, Wis., a corporation of Wisconsin
Filed Dec. 31, 1963, Ser. No. 334,754
4 Claims. (Cl. 323—45)

ABSTRACT OF THE DISCLOSURE

A regulating transformer system for inhibiting third harmonics comprising a high leakage reactance core having an air gap with an input and an aiding winding on one side of the air gap and one or more bucking windings on the other side of the air gap, a series connected capacitor and inductor tuned to the third harmonic of the input frequency connected in shunt across at least the bucking winding or windings, a load connected to the input and bucking windings, and a D.C. control winding responsive to the regulator output mounted on the core.

This invention relates to a regulator for line voltage or constant current purposes.

One of the problems in prior devices for regulation of line voltage or constant current has been the expensive and complicated arrangements hitherto required for accurate and fast response purpose. In such prior devices for regulating A.C. voltage by means of non-linear magnetic devices, the output waveform of such devices has generally been distorted which means that the output voltage contains undesirable harmonics. For many purposes, a distorted waveform is generally undesirable for use with equipment that normally must be supplied from such a regulator. Also, where such magnetic circuit regulating devices employ feedback circuits which sense the output voltage and apply a corrective signal to the regulator, the output voltage is difficult to measure in the sensing circuit when the waveform is other than sinusoidal. Thus, when the output waveform can be made sinusoidal, the output voltage can be regulated more closely by means of the feedback regulating system.

Saturable or non-linear magnetic type regulators can be filtered by means of series resonant type of filter but in these circuits, the entire voltage appears thereacross.

One of the objects of the present invention is to provide a voltage or current regulator wherein undesirable harmonics are inhibited and improved regulation is attained.

In one aspect of the invention, a high leakage reactance transformer core having an air gap therein is used. The main or primary winding is placed thereon, the A.C. source being connected across the main winding. An extension winding is connected in series with the main winding in aiding relation. An auxiliary or bucking winding also is on the core connected in opposed relation to the main winding and its extension. The load is connected across the three windings and may, of course, be at the very end of the main winding or a portion thereof or a portion of one of the other windings.

In one form, a series connected inductor and capacitor is connected in shunt across the extension and auxiliary windings. The inductor and capacitor combination is tuned to the third harmonic which is developed across the bucking winding.

In another aspect, the inductor and capacitor can be connected across the auxiliary or bucking winding alone and similarly tuned.

In a further aspect, the inductor and capacitor may be connected across the bucking winding and an extension thereof.

These and other objects, advantages and features of the invention will become apparent from the following description and drawings which are merely exemplary.

Figure 1:
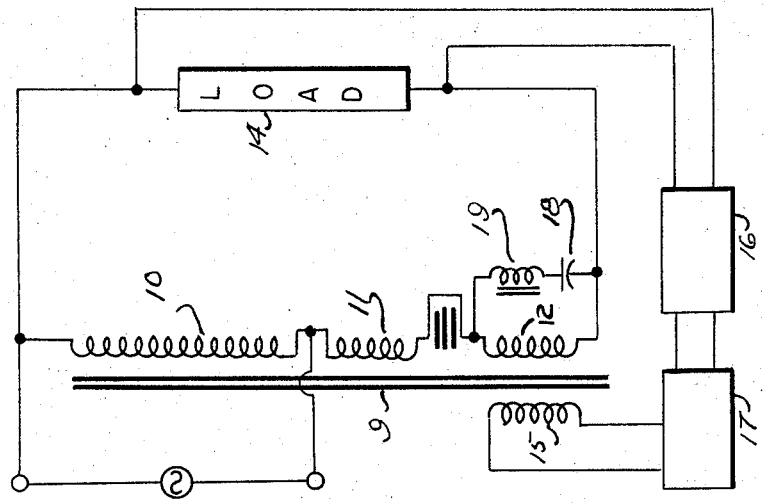
FIG. 1 is a schematic wiring diagram of one form of the invention.

Referring to FIG. 1, a source of A.C. is connected across main or primary winding 10, said winding being on core 9 which is of the high leakage reactance type having an air gap therein. Extension winding 11 is in series aiding relation with main winding 10. Auxiliary winding 12 is in opposed or bucking relation to extension winding 11. Windings 10 and 11 are mounted on the core 9 on one side of the air gap, and the auxiliary or bucking winding 12 is mounted on the core on the other side of the air gap whereby the air gap is located between the extension winding and the auxiliary winding. The D.C. control winding 15 is controlled by the amplifying means 16 and control means 17 connected across load 14, such being of any suitable type. In the form illustrated in FIG. 1, capacitor 18 and inductor 19, which may be termed the compensating network, are connected across auxiliary winding 12. The inductor and capacitor network is arranged so that it represents a low impedance at the third harmonic frequency across the terminals of auxiliary winding 12. Since the flux linking the auxiliary winding 12 is controlled by the D.C. windings which are located adjacent to winding 12, the flux may contain odd harmonics of the line frequency at certain levels of D.C. in the control winding. The low impedance of the compensating circuit produces odd harmonic ampere turns creating flux opposing the first mentioned odd harmonic flux components and thereby inhibiting induction of voltages of odd harmonic levels in winding 12. By so controlling these flux components at their source by means of the compensating circuit which is tuned to the third harmonic, the output voltage of the regulator can be made to be substantially harmonic-free of other than the line frequency.

The compensating circuit operates at its maximum effort when the control current is generally in the middle of its range and where the maximum harmonic generation would occur if the compensating circuit were not present to suppress these harmonics.

By way of example, a typical regulating transformer operating in the middle of the range of control current had a third harmonic in the output voltage of 7.9% of the fundamental. This same regulating transformer operated in the same region, but with compensating network values of capacitance, 22 microfarads, and inductance, 0.0355 henry, had a third harmonic in the output of only 2.1% of the fundamental voltage. The foregoing example was obtained in a regulating transformer rated and operating with a load of 5 kva. and a single phase input voltage of 230 volts and a frequency of 60 cycles. The particular point described above was for an output voltage of 230 volts, 60 cycles. The range of operation of the aforementioned regulating transformer was with an input voltage varying from 200 volts to 260 volts, while the output voltage was regulated to 230 volts over this range, the input value of 230 volts representing the middle of the range.

Figure 2:
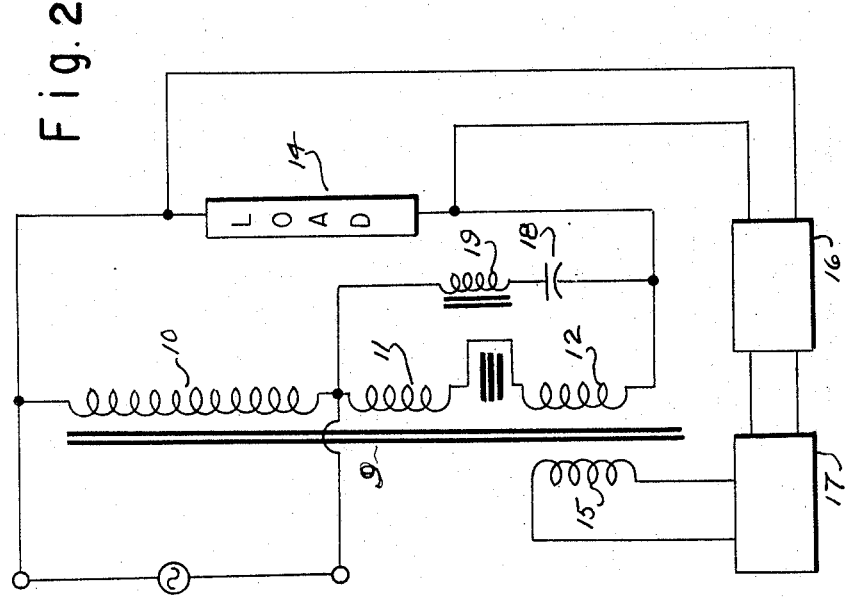
FIG. 2 is a schematic wiring diagram of another form of the invention.

Referring to FIG. 2 wherein the same components are given the same reference numerals, the compensating means including capacitance 18 and inductance 19 is connected across extension winding 11 and auxiliary winding 12. By so connecting, the compensating circuit is still effective in controlling the harmonics of flux in the secondary portion.

Figure 3:
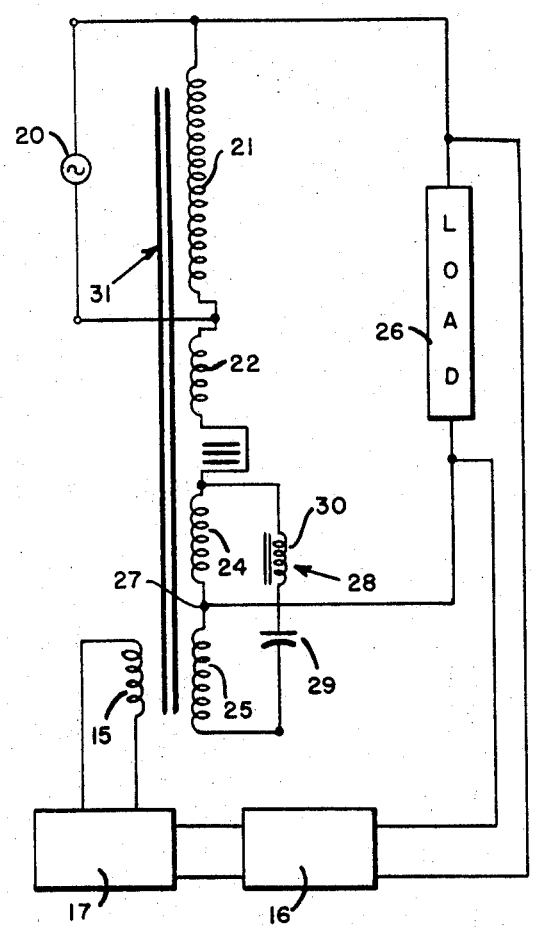
FIG. 3 is a schematic wiring diagram of a still further form of the invention.

Another form of the invention is illustrated in FIG. 3 wherein a source of A.C. 20 is connected across primary or main winding 21. Core 31, upon which the various windings are wound, is of the high leakage reactance type having an air gap therein. Extension winding 22 is connected in aiding relation with main winding 21. Auxiliary winding 24 is connected in opposing or bucking relation with main winding 21 and extension winding 22. The air gap is again located between the windings 22 and 24. Auxiliary winding 24 has a second auxiliary winding or extension 25 connected thereto, the load 26 being connected at point 27 between said auxiliary windings. The compensating network 28 consisting of capacitance 29 and inductance 30 is connected across auxiliary windings 24 and 25. While the auxiliary windings 24 and 25 are shown and described as separate windings, it will be evident that they could be a single winding with the load connected at point 27 to an intermediate tap, and the terms first auxiliary winding and second auxiliary winding are intended to apply to either arrangement. Likewise the windings 10 and 11 of FIGS. 1 and 2 and the windings 21 and 22 of FIG. 3 can be a single winding with intermediate taps.

It has been found that by using the arrangement of FIG. 3, a smaller capacitance can be used because of the higher voltage impressed thereacross due to the additional winding 25.

In the present invention, the presence of the filter or compensating network across the bucking winding acts to control the harmonics of the flux.

It should be apparent that various details may be made in the circuit without departing from the spirit of the invention except as defined in the appended claims.

What is claimed is:

1. In a regulator, the combination including load means, a high leakage reactance transformer core having an air gap, a main winding thereon with an extension winding connected thereto, an auxiliary winding on said core and connected in series with said extension winding in opposed polarity relation, said air gap being located between said extension winding and said auxiliary winding, a series connected capacitor and inductor connected in shunt at least across said auxiliary winding and tuned in the third harmonic so as to inhibit the third harmonics generated in said auxiliary winding, means connecting said load to said main winding and to said auxiliary winding, D.C. control winding means on said core, and means responsive to the load for controlling said D.C. control winding means.

2. In a regulator, the combination including load means, a high leakage reactance transformer core having an air gap, a main winding thereon with an extension winding connected thereto, an auxiliary winding on said core and connected in series with said extension winding in opposed polarity relation, said air gap being located between said extension winding and said auxiliary winding, a series connected capacitor and inductor connected in shunt across said extension and auxiliary windings and tuned to the third harmonic so as to inhibit the third harmonics generated in said auxiliary winding, means connecting said load to said main winding and to said auxiliary winding, D.C. control winding means on said core, and means responsive to load conditions for controlling said D.C. control winding means.

3. In a regulator, the combination including load means, a high leakage reactance transformer core having an air gap, a main winding thereon with an extension winding connected thereto, an auxiliary winding on said core and connected in series with said extension winding in opposed polarity relation, said air gap being located between said extension winding and said auxiliary winding, a series connected capacitor and inductor connected in shunt across said auxiliary winding and tuned to the third harmonic so as to inhibit the third harmonics generated in said auxiliary winding, means connecting said load to said main winding and to said auxiliary winding, D.C. control winding means on said core, and means responsive to the output for controlling said D.C. control winding means.

4. In a regulator, the combination including load means, a high leakage reactance transformer core having an air gap, a main winding thereon with an extension winding connected thereto, a first auxiliary winding on said core and connected in series with said extension winding in opposed polarity relation, said air gap being located between said extension winding and said first auxiliary winding, a second auxiliary winding series connected to said first auxiliary winding, a series connected capacitor and inductor connected in shunt across both of said auxiliary windings and tuned to the third harmonic so as to inhibit the third harmonics generated in said first auxiliary winding, means connecting said load to said main winding and to a point between said auxiliary windings, D.C. control winding means on said core, and means responsive to the output for controlling said D.C. control winding means.

References Cited

UNITED STATES PATENTS

| | | | |
|---|---|---|---|
| 2,714,188 | 7/1955 | Scherer | 323—45 X |
| 2,753,512 | 7/1956 | Helterline et al. | 323—45 |
| 2,825,024 | 2/1958 | Berghoff | 323—61 |
| 3,172,031 | 3/1965 | Sola | 323—56 |
| 3,235,789 | 2/1966 | Naster | 323—45 |

JOHN F. COUCH, *Primary Examiner.*

W. E. RAY, *Assistant Examiner.*